Figure 4:
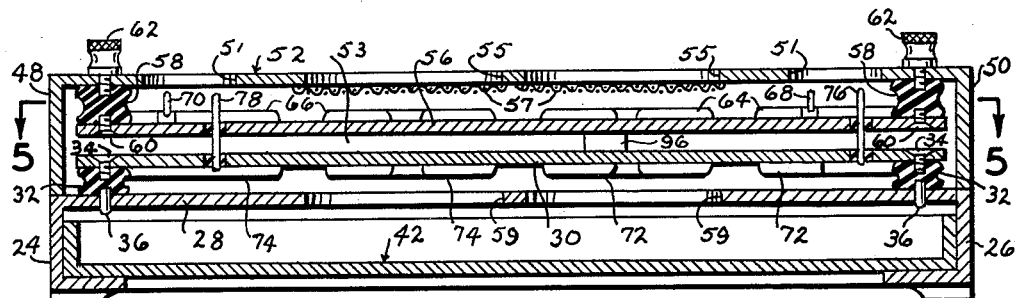

July 23, 1963
M. W. LEE, SR
3,098,426
STEAK COOKER AND TENDERIZER
Filed Aug. 3, 1961
2 Sheets-Sheet 1
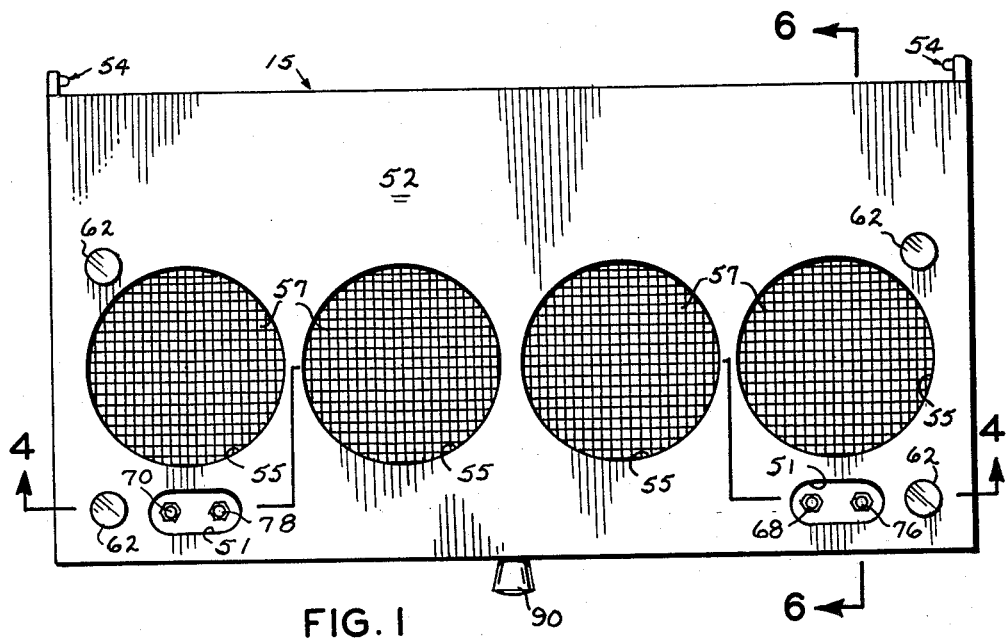
FIG. 1
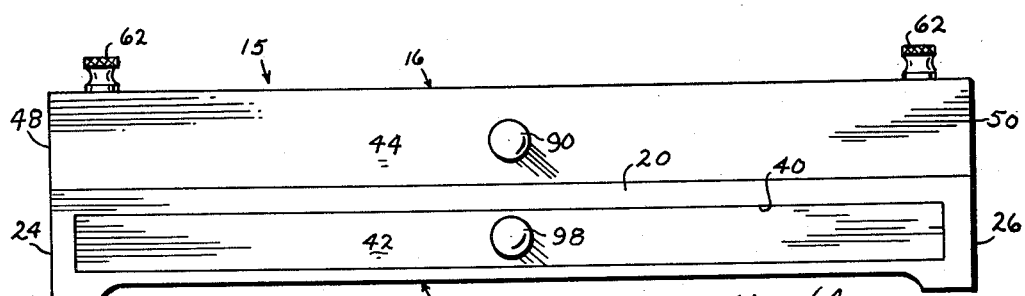
FIG. 2
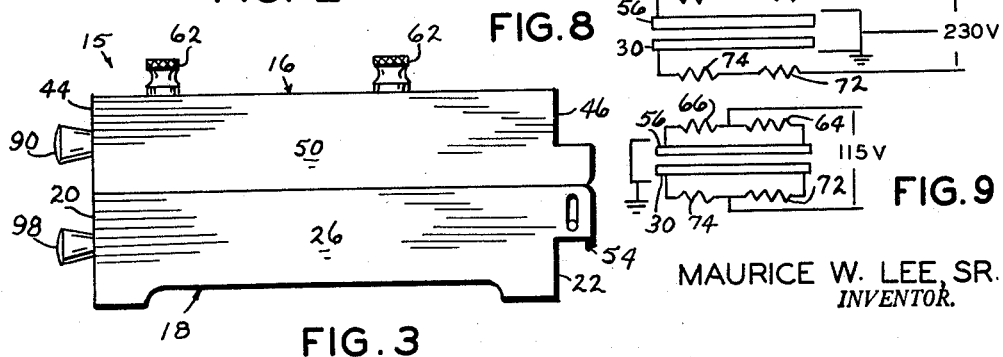
FIG. 3
FIG. 8
FIG. 9
MAURICE W. LEE, SR.
*INVENTOR.*
BY
*Robert K. Rhea*
AGENT

MAURICE W. LEE, SR.
INVENTOR.

BY
*Robert K. Rhea*
AGENT 3,098,426
STEAK COOKER AND TENDERIZER
Maurice W. Lee, Sr., Box 188, Boley, Okla.
Filed Aug. 3, 1961, Ser. No. 129,145
2 Claims. (Cl. 99—339)

The present invention relates to cooking devices and more particularly to a device for cooking foods by electrical resistance wherein the food stuff forms a part of the resistance.

The present invention is an improvement over a patent application filed by me and Maurice W. Lee, Jr., on February 2, 1961, Serial No. 86,664, for Resistance Cooker.

The device of the above mentioned application does not operate in a desired manner, if meat flavoring substances are applied to the meat before the cooking process is started, because the food flavoring substances, such as salt, tends to decrease the resistance between the electrical conducting plates thereby excessively increasing the current used.

It is, therefore, one of the objects of the invention to provide an improved cooker which incorporates a desired resistance with the electrical conducting plates so that food flavoring substances, such as salt, spices, monosodium glutamate, etc., may be applied to the meat before cooking.

Another important object is to provide an accelerated process of cooking wherein the cooking is done by heat generated by the internal resistance of the food in combination with heat produced by resistance heating elements.

An additional object is to provide a resistance cooking device which tends to tenderize meat being cooked, such as steak or ground meat, by breaking up the molecules thereof by electrolysis while simultaneously cooking the meat.

Another object is to incorporate sufficient impedance within the device to reduce and limit the electromotive force to a desired cooking voltage, such as 40 to 45 volts, while doing useful work with the impedance by heating conductor plates and toasting bread or buns in addition to cooking meats.

Still another object is to provide a device for rapidly cooking meats whereby a round steak may be cooked and tenderized in approximately two minutes and a serving of ground meat may be cooked in approximately one minute.

An additional object is to provide a device for cooking meats which eliminates the use of grease, or the like, on the cooking plate thereby resulting in a more greaseless finished product.

Still another object is to provide a device of this class which may be used for broiling food stuffs if desired.

The present invention accomplishes these and other objects by providing a housing having upper and lower sections hingedly connected together wherein the housing is provided with resistance elements, connected with a pair of conducting plates, and connected to a source of electrical energy. Meats placed between the plates forms a conductor for the current and is cooked by the heat generated by its resistance and the heat produced by the resistance elements.

Figure 5:
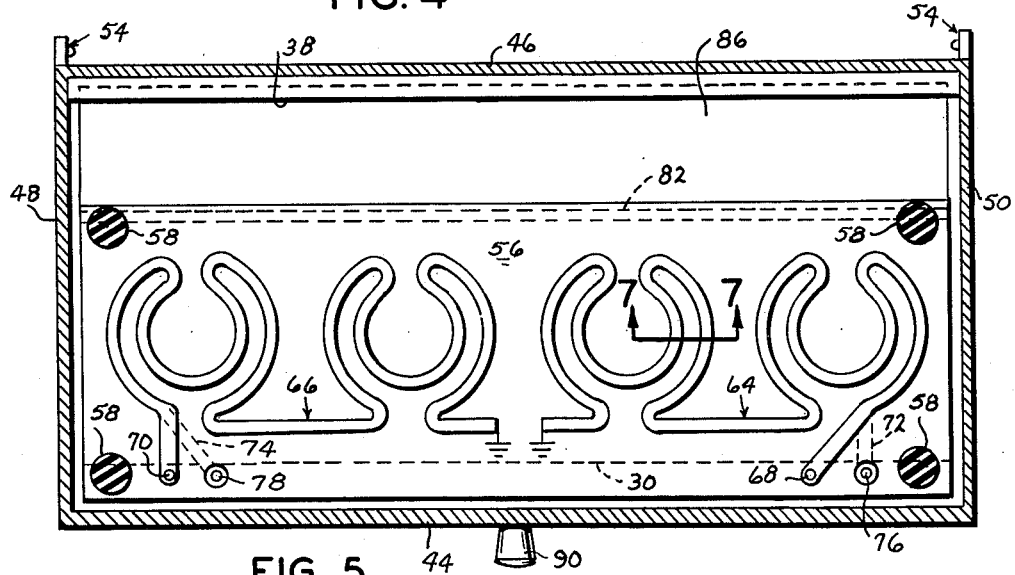
Figure 7:
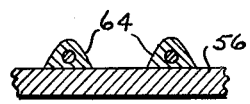
Figures 6, 10:
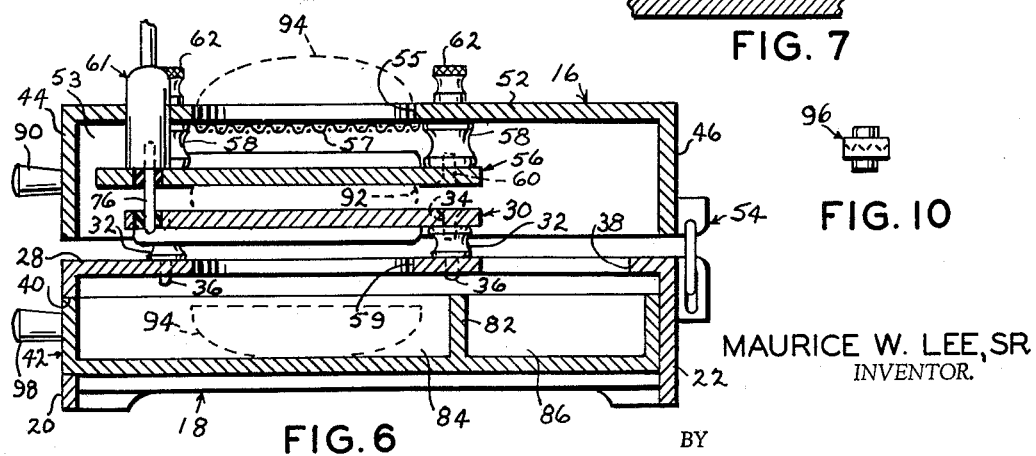

Other objects will be apparent from the following description when taken in conjunction with the accompanying two sheets of drawings, wherein:

FIGURE 1 is a top plan view of the device;
FIGURE 2 is a front elevational view;
FIGURE 3 is an end elevational view;
FIGURE 4 is a vertical cross-sectional view taken substantially along the line 4—4 of FIG. 1;
FIGURE 5 is a horizontal cross-sectional view taken substantially along the line 5—5 of FIG. 4;
FIGURE 6 is a vertical cross-sectional view taken substantially along the line 6—6 of FIG. 1;
FIGURE 7 is a vertical cross-sectional view taken substantially along the line 7—7 of FIG. 5;
FIGURES 8 and 9 are diagrammatic wiring diagrams; and
FIGURE 10 is an elevational view of a resistance placed between the conducting plates when broiling food stuffs.

Like characters of reference designate like parts in those figures of the drawings in which they occur.

In the drawings:
The reference numeral 15 indicates the device, as a whole, which is rectangular in general configuration and includes an upper or cover section 16 and a lower or base portion 18. The inverted box-like base portion 18 includes parallel spaced-apart forward and rearward walls 20 and 22, respectively, and opposing side walls 24 and 26. The base 18 further includes an upper horizontal wall 28, integrally connected to the walls 20—22 and 24—26. A rectangular lower or base conduction heating plate 30 is supported in spaced-apart parallel relation above the wall 28 by, preferably four, electrical insulating spools or spindles 32 positioned inwardly of the respective corners of the heating plate 30. Each of the insulating spools or spindles are preferably formed of a suitable fluorocarbon material, such as polytetrafluoroethylene, having a relatively high melting point, for example approximately 500° F. Screws 34, countersunk into the upper surface of the heating plate 30, threadedly connect the spools 32 to the plate. A pin 36, centrally carried in depending relation by each respective spool 32, is removably received within a suitable opening formed in the support plate 28. Rearwardly of the plate 30, the support plate 28 is provided with a rectangular opening 38 extending between the end walls 24 and 26 for the purposes which will be more fully explained hereinbelow.

A rectangular opening 40 is formed in the front wall 20 for removably receiving a rectangular upwardly open tray 42 dimensioned to be freely received by the respective inner surfaces of the side and end walls of the bottom section 18 for the purposes more fully explained hereinbelow.

The inverted box-like upper or cover section 16 similarly includes forward and rearward walls 44 and 46 and end walls 48 and 50, respectively, integrally joined by a top wall 52 thus forming a cooking compartment 53 above the base member 18. The rearward wall 46 is connected by suitable vertically adjustable hinge means 54 to the rearward wall 22 of the base section 18. An upper section conduction heating plate 56 is connected in parallel spaced relation above the plate 30 to the under surface of the top wall 52 by a plurality of spindles or spools 58 similar to the spools 32. Similarly, screws 60, countersunk into the lower surface of the heating plate 56, connect the plate to the spools 58 while a like plurality of thumb screws 62 are inserted through the top 52 and threadedly engaged with the respective spool 58 for the purposes to be presently explained.

Spaced inwardly of its forward edge the top wall 52 of the cover is provided with a pair of suitable openings 51 for receiving electrical plugs 61, one of which is shown in FIG. 6.

The top or upper wall 52 of the cover is provided with a plurality, four in the example shown, enlarged circular openings or apertures 55 which are positioned above the plate 56. The apertures may be rectangular if desired. Each of the apertures is covered by an open mesh screen 57 or wiring, such as that commonly known as "hardware cloth", which is secured to the lowermost surface of the wall 52 around each aperture 55. The upper wall 28 of the base member 18 is similarly provided with a like plurality of enlarged apertures 59 below the lower plate 30 and vertically aligned with the apertures 55.

Referring more particularly to FIG. 5, electrical resistance heating elements 64 and 66 are connected to the upper surface of the top heating plate 56. One end of the heating element 64 is connected with an upstanding prong 68 in co-operative alignment with one electrical plug receiving opening 51 in the cover top 52. The heating element 64 is arcuately curved to substantially describe concentric circles positioned directly below two of the enlarged apertures 55 in the cover top 52 with the other end of the heating element 64 grounded to the plate 56. Similarly, the heating element 66 has one end connected to a prong 70 similarly positioned on the plate 56 below the other electric plug receiving opening 51. The element 66 is similarly arcuately curved to define substantially concentric circular positions below the remaining pair of enlarged apertures 55 in the cover 52 while the free end of element 66 is similarly grounded to the plate 56.

As shown in FIGS. 4 and 5, identical heating elements 72 and 74 are similarly secured to the lowermost surface of the plate 30 above the respective apertures 59 in the base member. One end of the element 72 is connected to a prong 76 which extends upwardly in insulated relation through the plates 30 and 56 for co-operation with the prong 68 in contacting the plug 61 and conducting electrical energy to the elements 64 and 72. One end of the heating element 74 is similarly connected to a co-operating prong 78 in co-operation with the prong 70 for connecting the elements 66 and 74 to a source of electrical energy.

The tray 42 is provided with an upstanding partition 82 forming a forward tray compartment 84 below the apertures 59 and a rearward tray compartment 86 rearwardly of the plates 30 and 56.

*Operation*

The cover 16 is manually raised by means of a handle 90 and meats to be cooked, indicated by the dotted lines 92 (FIG. 6) is placed upon the plate 30. The meat is preferably placed on the plate 30 directly above the approximate position occupied by the circular shaped portions of the heating elements 72 or 74. The cover 16 is closed, placing the plate 56 in contact with the upper surface of the meats 92, while the hinge 54 permits the cover and base to be positioned in spaced-apart relation, as shown in FIG. 6. In operation electrical conductor plugs 61, one of which is shown in FIG. 6, are inserted through the cover wall plug receiving openings 51 to connect a source of electrical energy to the prongs 68—76 and 70—78. In this instance the source of electrical energy is a 230 volt source, as indicated in FIG. 8, wherein the heating elements 64—66 and 72—74 have a circuit completed between them and the plates 30 and 56 through the meats 92. The resistance of the heating elements lowers the voltage between the plates to a value of 40 to 50 volts which is a desired voltage when using the resistance of the food stuffs as a conductor for the current.

When it is desired to use only half the capacity of the device, only one of the plugs 61 is connected to the prongs, for example, the prongs 68 and 76. This arrangement is shown diagrammatically in FIG. 9 using a 115 volt source of electrical energy which cooks the food stuffs in a similar manner. The purpose of the apertures in the cover top or wall 52 are for receiving one-half of a bun 94 within each aperture. The screens 57, covering the apertures in the cover 16, support the buns and permit toasting the same by the heat radiated by the heating elements 64 and 66. Similarly the heating elements 72 and 74 toast the adjacent surface of bun halves placed within the tray compartment 84. It may be desirable to use the device for toasting the buns without cooking food stuffs between the plates 30 and 56 and in this instance suitable electrical resistance conductor means, shown at 96 (FIGS. 4 and 10), are placed between the plates 30 and 56 to complete the circuit and heat the respective resistance elements during the cooking operation.

Fat, normally forming a part of the meat, prevents the latter sticking to the plates 30 and 56 while any excess grease exuded by the meat 92 drains rearwardly of the plate 30 into the tray compartment 86 through the aperture 38. Similarly, when cleaning the device, grease and meat particles remaining on the surface of the plate 30 may be scraped rearwardly of the plate and allowed to fall into the tray compartment 86. The upper plate 56 is easily removed for cleaning by manually removing the thumb screws 62 while the plate 30 is removed for cleaning by simply lifting the latter off of the base wall 28. The tray 42 is removed from the base 18 by means of a handle 98.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An electrical resistance cooker, comprising: a downwardly open rectangular box-like base; a downwardly open box-like cover hingedly connected to said base and forming a cooking compartment above the upper surface of said base, the walls forming the top of said base and said cover each having a series of enlarged vertically aligned food receiving apertures therethrough; a pair of superposed rectangular conduction plates of less dimensions than said base and said cover disposed within said cooking compartment in horizontal spaced-apart relation; electrical insulating posts connecting the uppermost said plate to the lower surface of the top of said cover and connecting the lowermost said plate to the upper surface of the top of said base; an electrical resistance heating element secured in current conducting relation to the upper surface of said upper plate; another electrical resistance heating element secured in current conducting relation to the lower surface of said lower plate in co-operating relation with respect to the aligned enlarged apertures in said cover and said base; and means connecting a source of electrical energy to said electrical resistance heating elements.

2. An electrical resistance cooker, comprising: an inverted box-like base having forward, rearward and side walls joined by a top wall, the forward wall of said base having a rectangular opening, the top wall of said base having a series of enlarged food receiving apertures spaced inwardly of the forward and side walls, the top wall of said base having a rectangular aperture extending between its side walls adjacent its rearward wall; an inverted box-like cover having forward, rearward and side walls joined by a top wall, said cover being hingedly connected by its rearward wall to the rearward wall of said base and forming a cooking compartment above the top wall of said base, the top wall of said cover having a like series of enlarged food receiving apertures vertically aligned with the apertures in the top wall of said base; a pair of superposed conduction plates within said cooking compartment; a plurality of electrical insulating posts removably connecting said plates to the respective top walls of said cover and said base; electrical resistance heating elements secured in contiguous contact with and grounded in electrical conducting relation to the upper surface of said upper plate; additional electrical resistance heating elements secured in contiguous contact with and grounded in electrical conducting relation to the lower surface of said lower plate, all of said heating elements being within the area defined by the vertically aligned enlarged apertures in the top walls of said cover and said base; and means connecting a source of electrical energy to said heating elements and adapted to complete a circuit between said heataing elements and between said plates when electrical conducting food material is placed between and in contact with adjacent surfaces of said plates.

References Cited in the file of this patent

UNITED STATES PATENTS

| | | |
|---|---|---|
| 1,764,908 | Strauss | June 17, 1930 |
| 2,200,406 | Watson | May 14, 1940 |
| 2,226,036 | Watson | Dec. 24, 1940 |